April 23, 1963   W. SCHWIERING ET AL   3,086,606
MOTOR VEHICLE FRONT END STRUCTURE
Filed May 15, 1961
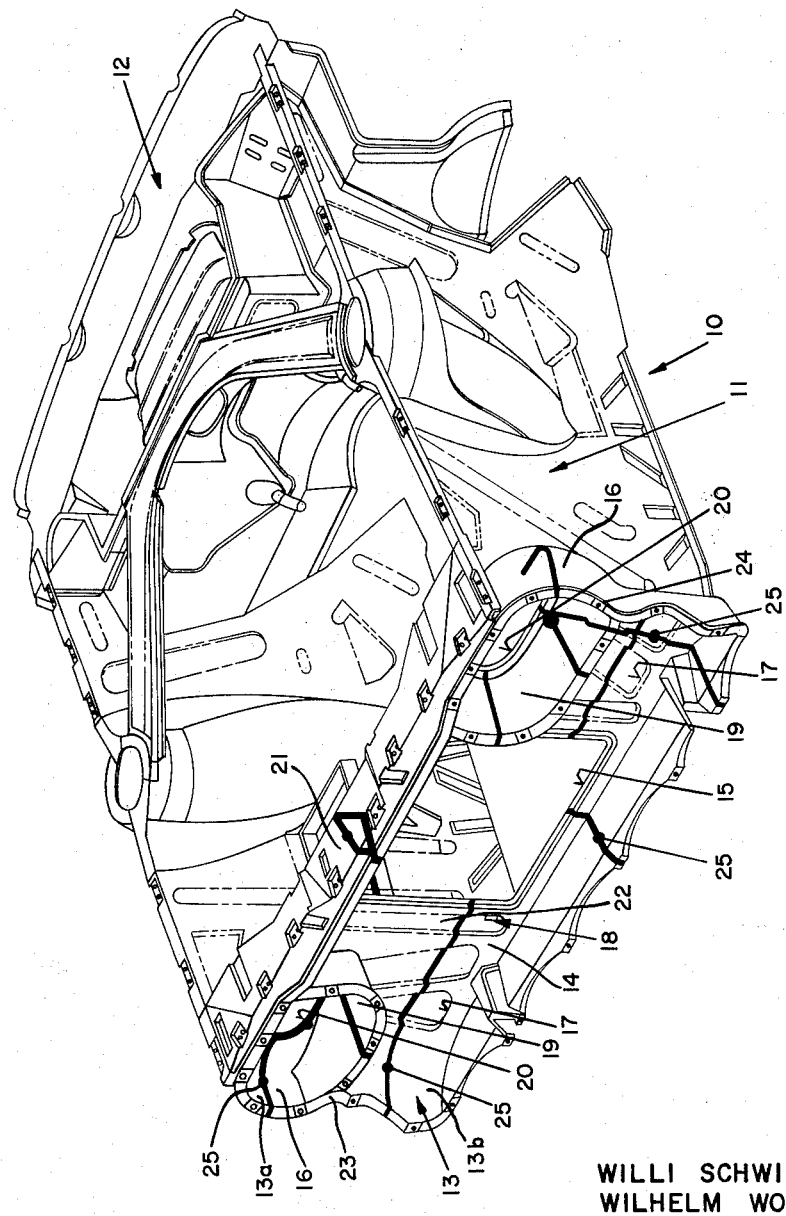
WILLI SCHWIERING
WILHELM WOLF
    INVENTORS
BY John R. Faulkner
   John J. Roethel
   ATTORNEYS

3,086,606
MOTOR VEHICLE FRONT END STRUCTURE
Willi Schwiering and Wilhelm Wolf, both of Cologne, Germany, assignors to Ford Motor Company, Dearborn, Mich., a corporation of Delaware
Filed May 15, 1961, Ser. No. 110,242
9 Claims. (Cl. 180—68)

This invention relates to a novel front end construction for motor vehicles.

More particularly, the present invention relates to sheet metal panel structures for bridging the front ends of the fender apron assemblies of front end units or engine compartment structures of semi-unitized and unitized or self-supporting vehicle bodies. It is conventional with bodies of this kind to provide multipart vertical plates and cross support members which can be bolted or welded together to form three dimensional underframes. These underframes must be highly torsion proof to receive without change of shape spring and road wheel forces. Additional cup-shaped drawn sheet metal parts must be provided to receive the head lamps. Further, separate protection or air flow screens are necessary for effective cool air admission to the radiator, and the latter must be arranged and bolted to special structural members. Special structural members are also necessary for receiving vehicle fender attachment means. The forming of the sheet metal parts, some of which have no important support functions and merely increase the weight of the assembly, and the fastening of the parts together involve many manufacturing and assembly processes. All of this adds considerable expense to the manufacturer of the vehicle body.

To avoid the foregoing disadvantages, it is an object of the present invention to provide a unitized sheet metal panel structure which extends substantially across the full front width of the vehicle body and which is rigidly connected to the wheel housing vertical plates or fender apron assemblies. This panel structure functions as a front alignment center piece and has provisions for receiving fender fastening devices. The inner portion used as a radiator partition is constructed as a tub-shaped drawn section and has a great resistance moment against bending forces in any direction due to its height and special depth. The panel provides radiator support stays, has apertures for the admission of air to the engine compartment and is formed to provide the outer halves of head lamp cups. In a simple manner, complete head lamp cups are obtained by supplemental inner half-shell pressed sheet metal parts which are fastened to the outer halves. The head lamp cups, which in a conventional structure must be inserted separately, are no longer required.

The panel structure has a flange substantially around its hole outer peripheral edge so that on its upper edge a support piece may be installed bearing a locking device for the engine hood. The support piece together with the panel member forms a box-like profile. The transmission of cross forces to the side wheel housing vertical plates or fender apron assemblies is thus improved. The peripheral flange serves for fastening the head lamps, the fenders and an aligning center piece. In those sections where the various flanges of the parts overlap, fastening means can be minimized. For example, where the flanges overlap, the same bolt can be used to fasten a head lamp and a fender or a fender and a center piece or all three components at the same time.

On the rear side of each of the head lamp cups a hand hole is left open. After opening the engine hood, the adjusting devices for the head lamps are easily accessible from the engine compartment. The hand holes can be closed by a removable plastic or rubber cap.

Other objects and advantages of the present invention will be made more apparent as this description proceeds, particularly when considered in connection with the accompanying drawing, wherein the FIGURE is a perspective view of the front end unit of a vehicle body embodying the sheet metal panel structure bridging the fender apron assemblies.

Referring now to the drawing, the reference numeral 10 generally designates the front end unit of a vehicle body. The front end unit 10 comprises wheel housing vertical plates or fender apron assemblies 11 and a dashboard panel 12 at the rear end thereof. At the front end of the unit 10 a sheet metal formed panel structure 13 extends substantially across the full width of the unit.

The sheet metal panel structure is preferably designed as a deep drawn piece and is rigidly bolted or welded to the wheel housing vertical plates or fender apron assemblies 11. The upper corners 13a of the panel structure 13 are drawn tub-like or half-shell in form and form the outer halves of head lamp cups or housings 16. The bottom corners 13b of the panel structure 13 are shaped or contoured as air inlet surfaces extending toward the vehicle center. Through special apertures 17 fresh air may be obtained through suitable ducts (not shown) for heating and ventilation of the vehicle passenger compartment.

The sheet metal panel structure has a large square aperture 15 centrally located therein behind which an engine cooling radiator (not shown) is adapted to be arranged. The radiator may be secured at apertures 18 by suitable fastening devices (not shown) to the fastening plates 22.

Inserted tub parts or inner half-shells 19 attached to the outer half-shells 16 complete the head lamp cups or housings. Suitable hand holes 20 are provided giving access to the interior of the head lamp housings from the engine compartment.

The substantially plane portion of the sheet metal panel 13 which protects the engine compartment to the front is designated as cross member 14. The panel 13 has a flange 23 extending almost completely around its peripheral edge. On its upper edge, the flange 23 is rigidly connected to a support member 21. This support member 21 forms a box-like profile together with a section of the panel 13. The box-like profile structure is welded at its ends to the wheel housing vertical plates or fender apron assemblies 11. The support member 21 is adapted to receive a latching device (not shown) for the engine compartment hood.

To the flange 23 of the panel 13, the fenders, the head lamps system and a lining center piece (none of which are shown) are adapted to be bolted. For this purpose the flange 23 is provided with a suitable number of perforations or bolt receiving apertures 24. The same bolt (not shown) may be used at locations where the fastening flanges of fenders, head lamps and the lining center piece overlap to secure several or all of the parts to the flange 23 at the same time.

Several cutting lines 25 are shown in the drawing to demonstrate the contour or shape of the panel 13 at the respective locations.

It will be understood that the invention is not to be limited to the exact construction shown and described, but that various changes and modifications may be made without departing from the spirit and scope of the invention as defined in the appended claims.

We claim:

1. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings.

2. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings, and said panel structure having at least one passenger compartment ventilation air intake aperture therein.

3. In a vehicular front end structure having fender apron assemblies connected at their rear ends by a dash panel, a panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof being contoured to provide air inlet receiving surfaces and at the upper extremities thereof being formed as the outer half-shells of head lamp housings, and half-shell members positioned inwardly of said outer half-shells to form complete head lamp housings.

4. In a vehicular front end structure having fender apron assemblies connected at their rear ends by a dash panel, a panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof being contoured to provide air inlet receiving surfaces and at the upper extremities thereof being formed as the outer half-shells of head lamp housings, said head lamp housings being provided with hand holes in the rear for access from said engine compartment.

5. In a vehicular front end structure having fender apron assemblies connected at their rear ends by a dash panel, a panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof being contoured to provide air inlet receiving surfaces and at the upper extremities thereof being formed at the outer half-shells of head lamp housings, said panel structure having at least one passenger compartment ventilation air intake aperture therein, and half-shell members positioned inwardly of said outer half-shells to form complete head lamp housings, said head lamp housings being provided with hand holes in the rear for access from said engine compartment.

6. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings, and said panel structure having a peripheral flange extending therearound, said flange and head lamp housings having aligned apertures adapted to receive common fastening means for securing the vehicle fenders and head lamps thereto.

7. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings, and a support member disposed across the top of said panel structure to form a structural unit having a box-like profile, said structural member having an over-all high resistance moment to bending forces.

8. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings, and a support member disposed across the top of said panel structure to form a structural unit having a box-like profile, said structural member having an over-all high resistance moment to bending forces, said structural unit being welded at each of its ends to said apron assemblies.

9. In a vehicular front end structure having fender apron assemblies connected at their rear ends by a dash panel, a deep drawn panel structure secured to said fender apron assemblies at their front ends, said panel structure extending substantially across the full width of said front end structure, said panel structure comprising a supporting plate section and a vertical plate portion having radiator fastening device receiving means, said panel structure at the lower extremities thereof having integral concavely contoured forwardly extending side walls to provide air inlet receiving surfaces and at the upper extremities thereof being formed as the outer half-shells of head lamp housings, said panel structure having a peripheral flange extending therearound, said flange and head lamp housings having aligned apertures adapted to receive common fastening means for securing the vehicle fenders and head lamps thereto, and a support member disposed across the top of said panel structure to form a structural unit having a box-like profile, said structural member having an over-all high resistance moment to bending forces, said structural unit being welded at each of its ends to said apron assemblies.

References Cited in the file of this patent

UNITED STATES PATENTS

| | | |
|---|---|---|
| 1,048,530 | Harlow | Dec. 31, 1912 |
| 1,754,086 | Feilcke | Apr. 8, 1930 |
| 1,838,114 | Schulman | Dec. 29, 1931 |
| 2,051,263 | MacPherson et al. | Aug. 18, 1936 |
| 2,584,576 | Gould | Feb. 5, 1952 |
| 2,715,448 | Zeeb | Aug. 16, 1955 |

FOREIGN PATENTS

| | | |
|---|---|---|
| 347,314 | Germany | Jan. 19, 1922 |